(12) United States Patent
Lehr

(10) Patent No.: US 8,998,067 B2
(45) Date of Patent: Apr. 7, 2015

(54) TUBULAR FRICTION WELDING JOINING METHOD WITHOUT ROTATION OF THE TUBULARS

(71) Applicant: Joerg Lehr, Celle (DE)

(72) Inventor: Joerg Lehr, Celle (DE)

(73) Assignee: Baker Hughes Incorporated, Houston, TX (US)

( * ) Notice: Subject to any disclaimer, the term of this patent is extended or adjusted under 35 U.S.C. 154(b) by 44 days.

(21) Appl. No.: 13/738,681

(22) Filed: Jan. 10, 2013

(65) Prior Publication Data

US 2014/0191016 A1 Jul. 10, 2014

(51) Int. Cl.
*B23K 20/12* (2006.01)
*B23K 20/26* (2006.01)

(52) U.S. Cl.
CPC ........... *B23K 20/129* (2013.01); *B23K 20/1205* (2013.01); *B23K 20/26* (2013.01); *B23K 2201/06* (2013.01); *B23K 2201/10* (2013.01)

(58) Field of Classification Search
USPC .............. 228/2.1, 2.3, 112.1, 113, 114.5
See application file for complete search history.

(56) References Cited

U.S. PATENT DOCUMENTS

| | | | |
|---|---|---|---|
| 3,538,592 A * | 11/1970 | Padilla ........................... | 228/102 |
| 3,609,854 A * | 10/1971 | Hasui ............................ | 228/114 |
| 3,745,641 A * | 7/1973 | Paolini ......................... | 228/114.5 |
| 3,753,820 A * | 8/1973 | Ishikawa et al. .............. | 156/73.5 |
| 3,779,446 A * | 12/1973 | Lemelson ..................... | 228/15.1 |
| 3,820,231 A * | 6/1974 | Sage .............................. | 228/113 |
| 3,848,793 A | 11/1974 | Herman | |
| 3,874,067 A * | 4/1975 | Toyooka et al. ............. | 228/112.1 |
| 4,060,190 A * | 11/1977 | Paolini .......................... | 228/2.3 |
| 4,063,676 A | 12/1977 | Lilly | |
| 4,331,280 A * | 5/1982 | Terabayashi et al. ....... | 228/114.5 |
| 5,071,053 A | 12/1991 | Heijnen | |
| 5,697,545 A * | 12/1997 | Jennings et al. ............ | 228/112.1 |
| 6,142,360 A * | 11/2000 | Hutt ............................. | 228/114.5 |
| 6,634,540 B1 | 10/2003 | Afschrift et al. ............ | 228/114.5 |
| 6,637,642 B1 * | 10/2003 | Lingnau ...................... | 228/112.1 |
| 7,168,606 B2 | 1/2007 | Badrak | |
| 7,267,258 B2 * | 9/2007 | Pfeiler ........................ | 228/112.1 |
| 7,441,689 B2 * | 10/2008 | Crasser ....................... | 228/110.1 |
| 2010/0136369 A1 | 6/2010 | Ayer et al. | |

FOREIGN PATENT DOCUMENTS

GB 2322586 A * 9/1998

* cited by examiner

*Primary Examiner* — Devang R Patel
(74) *Attorney, Agent, or Firm* — Steve Rosenblatt

(57) ABSTRACT

Tubulars are joined to each other without rotation of the tubulars. A coupling is placed between the aligned tubulars and is supported for rotation or oscillating about its longitudinal axis. The tubulars are clamped in a manner that allows a compressive force to be transmitted to the coupling as the coupling is rotated. An induction device can preheat each connection site before friction welding and/or provide heat as the connection is made and is allowed to cool down. The process can continuously create a string of casing or liner that can be run in or drilled into a wellbore.

21 Claims, 1 Drawing Sheet

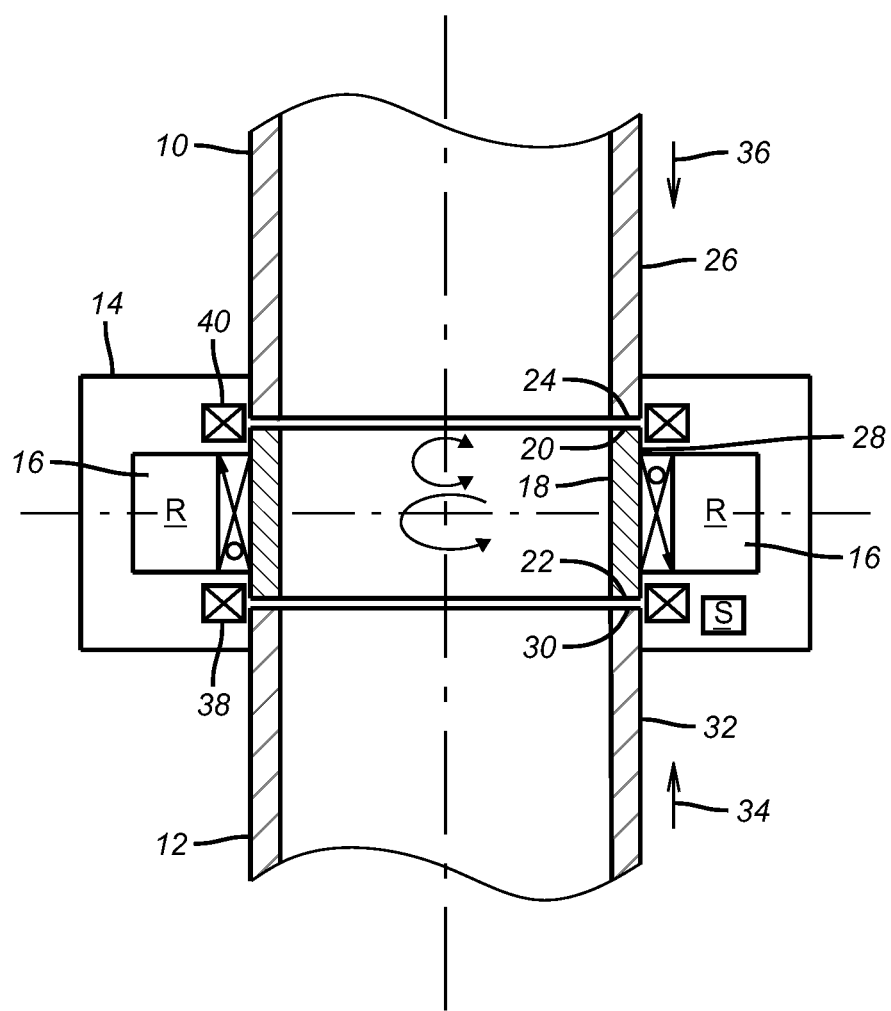

TUBULAR FRICTION WELDING JOINING METHOD WITHOUT ROTATION OF THE TUBULARS

FIELD OF THE INVENTION

The field of the invention is joining tubulars with friction welding and more particularly with an intermediate rotating or oscillating coupling with an optional induction unit for heating before, during or after the connection is made with compression applied to the fitting.

BACKGROUND OF THE INVENTION

Tubulars such as casing or liners are most frequently joined with threaded connections. These connections when used in a drilling environment are subject to fatigue from the dynamic loads encountered during such drilling procedures. There is a need to enhance the fatigue life of such connections.

Friction stir welding techniques have been used to join tubulars where the tubulars are butted together or alternatively with a shim introduced between them and the welding apparatus is rotated around the tubulars on its own axis while pushed into the junction of the tubulars as shown in US Publication 2010/0136369. In U.S. Pat. No. 3,779,446 the axis of the welding apparatus in FIGS. 3 and 4 is parallel to the tubulars being joined as the apparatus rotates on its axis and is brought to contact end flanges in the tubulars to be joined. Other similar references are U.S. Pat. Nos. 4,063,676; 5,071,053; 6,142,360; 3,848,793; 7,168,606.

The common theme to many of these techniques is to insert a ring shaped member in a notch formed by ends of adjacent tubulars and apply radial force to the ring while it is rotated. The present invention applies axial force to a rotated or oscillating coupling through the tubular ends that are to be joined to opposing ends of the coupling. An induction heating device can be deployed at each connection to preheat the connection location before the friction welding begins during or/and after the connection is made. The use of the present invention enhances energy efficiency, weld quality, material selection choices and connection reliability; while enabling reduced equipment size and cost. These and other features of the present invention will be more readily apparent from a review of the detailed description and the associated drawing while recognizing that the full scope of the invention is to be determined from the appended claims.

SUMMARY OF THE INVENTION

Tubulars are joined to each other without rotation of the tubulars. A coupling is placed between the aligned tubulars and is supported for rotation about its longitudinal axis. The tubulars are clamped in a manner that allows a compressive force to be transmitted to the coupling as the coupling is rotated. An induction device can preheat each connection site before friction welding and/or provide heat as the connection is made and is allowed to cool down. The process can continuously create a string of casing or liner that can be run in or drilled into a wellbore.

BRIEF DESCRIPTION OF THE DRAWING

The FIGURE illustrates two tubulars with a spaced coupling that can be rotated to make a connection at opposed ends using axial compression of the coupling provided by axial force through the tubulars that form the string being assembled.

DETAILED DESCRIPTION OF THE PREFERRED EMBODIMENT

Referring to the FIGURE an upper tubular 10 is to be joined to a lower tubular 12. A coupling or short tubular segment 18 that has opposed ends 20 and 22 is gripped by a frame 14 that has a capability of rotating the segment 18.

The lower end 24 of the upper tubular 10 is aligned with end 20 of the segment 18. These ends can be parallel or notched into a v-shape with the tapered gap enlarging toward the outside surfaces 26 and 28. Similarly the upper end 30 of the lower tubular 12 is aligned with end 22 of the segment 18 with the ends being parallel or tapered with the gap enlarging toward outside surfaces 28 and 32. Arrows 34 and 36 represent schematically a device that applies a compressive force onto segment 18 as it is gripped and rotated in either clockwise or counterclockwise directions by the gripping and rotating assembly 16. There can be one or more than one gripping and rotating assembly 16. Optionally the frame 14 can be split so that it can open to release the assembly of tubulars 10 and 12 joined to segment 18 by lateral movement. Alternatively in a one piece construction of the frame 14 the assembled string can be supported with slips on the rig floor so that the frame can be cleared of the top tubular 10 and reloaded with another segment 18 for the process to repeat.

One or more induction heaters 38 or 40 can be located at opposed ends or one end of the segment 18. These can be used to preheat the friction welding locations either before the weld is made, during welding or for heat treatment after the weld is completed.

The frequency of the induction heating field can be changed in each heater and during each process step depending on material properties and process parameters to control the depth of the heating zone and temperature distribution within the weld and the parts to be connected. High frequency fields tend to concentrate the heat up zone on surface and low frequency fields (e.g. 50 Hz) allow the heat up zone to go deeper in to the parts to be treated.

Instead of 360° rotation of the segment 18 it can be oscillated with either opposed rotational movements, more linear movement pattern e.g. perpendicular to the rotation axis or combined movement patterns e.g. opposed rotational movements +/−0.5° with 50 Hz and 0.2 mm radial movement with 100 Hz. Combined movement patterns support self cleaning and material unification of the weld and reduce required rotation speed of the segment.

The compressive force can be applied upon the start of the movement of the segment 18 or it can be applied thereafter. The local temperature can be monitored at the weld locations with an external sensor shown schematically as S to a desired value by control of the compressive force indicated by arrows 34 and 36.

Those skilled in the art will now appreciate that tubulars can be joined without rotating them by using an intervening segment which is rotated or oscillated while being placed in a compressive loading situation to control the formation of the friction weld. The one of the tubulars can be axially advanced toward the other or both can be forced toward the segment as it rotates or oscillates for weld formation. The segment can be preheated before being placed into welding position with preferably an induction heating device or the heating can occur just before the welding with the segment in position to preheat the segment. After the weld is completed further heating can be applied in the same manner for stress relieving or other purposes.

As another option the two tubulars can be abutted and relatively moved or rotated with axially applied compressive force to friction weld them to each other.

Cooling and gas shielding functionality can be added if needed.

The connection sleeve might be made out of a different material than the base material of the tubulars that it connects with the goal to improve weld performance parameters such as strength, expandability or quality. Some materials might be welded or expanded only with a connection sleeve made of a suitable material.

The above description is illustrative of the preferred embodiment and many modifications may be made by those skilled in the art without departing from the invention whose scope is to be determined from the literal and equivalent scope of the claims below:

I claim:

1. A method of joining tubulars with friction welding for forming a tubular string to be delivered to a subterranean location, comprising:
    aligning end walls ends of tubulars to be welded, each said end wall defined by an inner edge and an outer edge;
    introducing a tubular segment between said tubulars, said tubular segment having opposed end walls having an inner edge and an outer edge;
    bringing said tubular end walls together against opposing end walls of said segment to put said end walls ends under axial compressive stress; and
    joining said tubular end walls ends to said opposing end walls of said segment using combined movement patterns of said tubular segment, wherein the combined movement comprises opposed oscillating movement at one frequency and a linear movement at a different frequency in a direction perpendicular to an axis of said aligned tubulars.

2. The method of claim 1, comprising:
rotating said segment about a segment longitudinal axis in at least one direction.

3. The method of claim 1, comprising:
oscillating said segment in opposed directions.

4. The method of claim 3, comprising:
performing said oscillating about a segment longitudinal axis.

5. The method of claim 1, comprising:
varying axial compressive stress.

6. The method of claim 5, comprising:
maintaining a predetermined temperature at said tubular walls ends of said tubulars with said varying compressive stress.

7. The method of claim 6, comprising:
sensing the temperature at one of said tubular walls ends during said joining.

8. The method of claim 1, comprising:
adding or removing heat to said tubular segment.

9. The method of claim 8, comprising:
adding or removing heat to said tubular segment before or during said joining.

10. The method of claim 9, comprising:
using an induction heating device for said adding heat.

11. The method of claim 1, comprising:
mounting said tubular segment in a frame.

12. The method of claim 11, comprising:
using at least one motor to rotate said tubular segment in at least one direction.

13. The method of claim 11, comprising:
providing a split in said frame to facilitate removal of said frame after said joining.

14. The method of claim 1, comprising: shaping said tubular end walls ends and opposing end walls of said tubular segment.

15. The method of claim 13, comprising:
varying axial compressive stress.

16. The method of claim 15, comprising:
maintaining a predetermined temperature at said end walls ends of said tubulars with said varying compressive stress.

17. The method of claim 16, comprising:
sensing the temperature at one of said end walls ends during said joining.

18. The method of claim 17, comprising:
adding heat to said tubular segment.

19. The method of claim 18, comprising:
adding heat to said tubular segment before or during said joining.

20. The method of claim 19, comprising:
using an induction heating device for said adding heat.

21. The method of claim 3, comprising: oscillating a longitudinal segment axis with respect to aligned axes of said tubular end wall ends.

* * * * *